F. C. HOCKENSMITH.
ROLLER BEARING FOR MINE CAR WHEELS.
APPLICATION FILED OCT. 17, 1911.

1,066,276.

Patented July 1, 1913.

WITNESSES

INVENTOR
F. C. Hockensmith

UNITED STATES PATENT OFFICE.

FRANKLIN C. HOCKENSMITH, OF PITTSBURGH, PENNSYLVANIA, ASSIGNOR TO HOCKENSMITH WHEEL & MINE CAR COMPANY, OF PENN STATION, PENNSYLVANIA, A CORPORATION OF PENNSYLVANIA.

ROLLER-BEARING FOR MINE-CAR WHEELS.

1,066,276. Specification of Letters Patent. Patented July 1, 1913.

Application filed October 17, 1911. Serial No. 655,220.

*To all whom it may concern:*

Be it known that I, FRANKLIN C. HOCKENSMITH, a resident of Pittsburgh, in the county of Allegheny and State of Pennsylvania, have invented certain new and useful Improvements in Roller-Bearings for Mine-Car Wheels, of which the following is a specification.

One purpose of the present invention is to so construct a roller bearing wheel for mine cars, etc.. that the oil is effectively confined within the roller space, there being practically no waste in either direction along the axle. Heretofore, roller bearings for such service have been ordinarily applied to what are known as cap wheels which inclose the extremity of the axle together with the device for confining the wheel on the axle. An objection to this type of wheel is that the axle is hidden from view and it is difficult to inspect the bearing, and one result is that accidents frequently occur owing to breaking or dislodgment of the wheel-securing device, it being usually impossible to detect such derangement in advance of an accident. With the securing means open to view any defect can be readily seen and remedied. The oil-confining means within the hub is embodied in washers of novel construction arranged within the bore of the wheel at opposite ends of the roller bearing, preventing escape of oil from either end of the hub.

Figure 1:
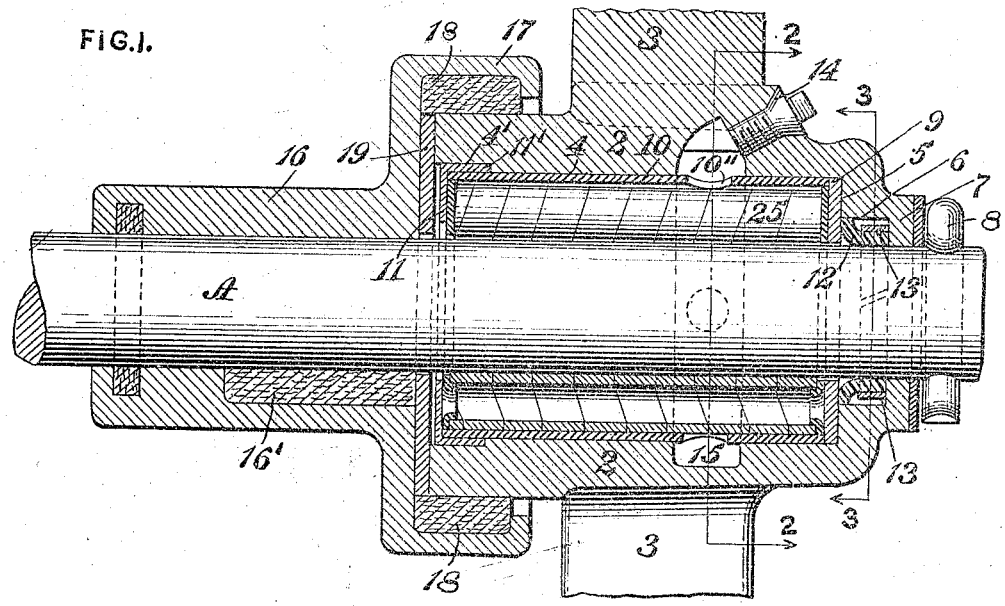
Figure 4:
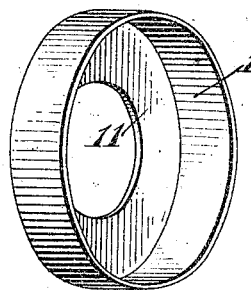
Figure 2:
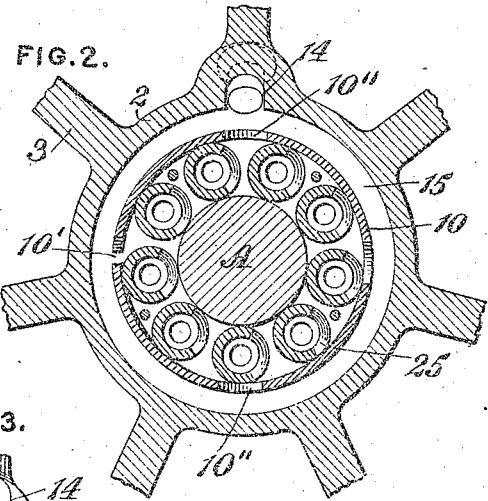
Figure 3:
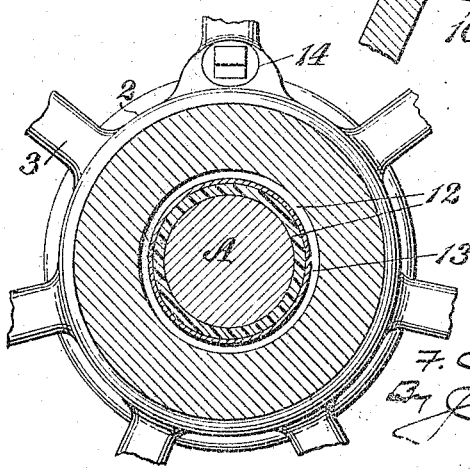

In the accompanying drawings, Figure 1 is a longitudinal section of a wheel hub constructed in accordance with the invention, the same being shown in connection with the usual bearing secured to the car structure and through which the axle extends as well as through the wheel. Figs. 2 and 3 are vertical cross sections on lines 2—2 and 3—3, respectively, of Fig. 1. Fig. 4 is a detail of the flanged washer.

Referring to the drawings, 2 designates the wheel hub from which radiate spokes 3 in usual manner. The wheel bore is enlarged for a distance inwardly from the inner end of the hub as indicated at 4, this enlargement terminating in the abutment-forming shoulder 5 which separates the roller space 4 from space 6 of smaller diameter, while adjacent space 6 is part 7 of the hub which has a working fit on axle A, the extremity of the latter projecting through the front end of the hub and formed with an opening to receive a cotter 8 of usual construction. A metallic washer 9 is pressed into roller space 4 against abutment 5, this washer being engaged by one end of the cage which confines the bearing rollers 25. Inclosing the rollers is the spring metal jacket or lining 10 which is split longitudinally at 10′, Fig. 2, so that it may contract sufficiently to enter the bore and tightly fit and grip the same. The roller bearing, including lining 10, is of familiar construction and need not be described in detail.

The extremity of bore 4 at the inner end of the hub is enlarged circumferentially at 4′, this enlargement extending inwardly beyond the extremity of lining 10, and fitting this enlargement is washer 11 which is flanged on one side at 11′ with the flange fitting enlargement 4′, as in Fig. 1. In the front end of the hub a flexible gasket 12, preferably of leather, bears against the outer side of washer 9, gasket 12 being confined on the axle by the split spring ring 13.

Oil is admitted to the hub through the plugged inlet 14, the hub bore being cored circumferentially at 15 to form an oil passage with lining 10 provided with suitable openings 10″ for passing the oil into the roller-confining cavity.

Axle A extends through the usual bearing 16, which may be secured to the car body in any suitable manner, the outer end of the bearing formed with the flanged enlargement 17 which embraces the inner end of the hub, felt or other suitable packing 18 being confined in said enlargement around the periphery of the hub, as shown. The inner extremity of the hub bears against the washer 19. This extremity of the hub usually wears away more or less, but owing to the clearance between washers 19 and 11 the latter is not subjected to this wear. In the lower portion of bearing 16 is the usual cavity for confining packing material 16′.

Washer 11 prevents the escape of oil from the bottom of bore 4, the oil being pocketed therein until it is of a depth almost sufficient to reach axle A before it can escape through the washer. And such oil as may escape in this way is checked by washer 19 and packings 16′ and 18 which prevent abnormal waste, though maintaining the several surfaces of bearing 16, washer 19, and the extremity of hub 2 thoroughly lubricated. At the front end of the hub gasket 12 forms practically a seal around the axle and prevents the escape of oil in that direction.

With a roller bearing car wheel constructed as here shown the rollers are fully lubricated at all times without wasting the oil, and the bearing surfaces and oil chamber are so inclosed as to effectively exclude coal dust and other foreign matter which causes bearings to wear rapidly.

I claim:—

1. The combination with an axle, of a wheel hub having a bore through which the axle extends, the bore being enlarged at its inner end, a roller bearing casing insertible through said inner end, the outer end of the bore being contracted to form an abutment with the intermediate portion adapted to frictionally receive the bearing casing, rollers within said casing, means for supplying oil to the rollers in rear of the plane of said abutment, and a washer at the bore enlargement at the inner extremity of the hub, the washer being flanged peripherally to embrace the extremity of the roller casing with the flange entered between the casing and the wall of the bore, said washer aiding in retaining the bearing in position, the outer end of the bore being of a size to rotatively fit on the axle, the outer face of the hub being substantially imperforate.

2. The combination with an axle, of a wheel hub having a bore through which the axle extends, the bore being enlarged at its inner end, a roller bearing casing insertible through said inner end, the outer end of the bore being contracted to form an abutment with the intermediate portion adapted to frictionally receive the bearing casing, rollers within said casing, means for supplying oil to the rollers in rear of the plane of said abutment, a washer at the bore enlargement at the inner extremity of the hub, the washer being flanged peripherally to embrace the extremity of the roller casing with the flange entered between the casing and the wall of the bore, said washer aiding in retaining the bearing in position, the outer end of the bore being of a size to rotatively fit on the axle, the outer face of the hub being substantially imperforate, the portion of the bore intermediate the abutment and the contracted outer end being of a size intermediate the sizes of the ends of the bore, and an oil-stopping device within said intermediate bore portion.

3. In combination, a wheel hub having its axle-receiving bore enlarged at its inner end to receive a roller bearing with the end of the bore enlargement forming an abutment, a roller bearing casing fitting within the enlargement and stopped by said abutment, rollers within said casing, means for supplying oil to the rollers, and a peripheral flanged washer through which the axle is adapted to extend, said washer fitting within the bore enlargement behind said casing with the flange of the washer disposed toward said abutment and extending between the casing and the wall of the bore.

4. In combination, a shaft or axle, a wheel hub having its axle-receiving bore enlarged at its inner end to receive a roller bearing with the end of the bore enlargement forming an abutment, the outer face of the hub surrounding the bore being substantially imperforate, the outer end of the bore having a size to rotatively fit on the shaft or axle, a roller bearing casing fitting within the enlargement and stopped by said abutment, rollers within said casing, means for supplying oil to the rollers, an oil confining washer fitting within the bore enlargement behind said casing and adapted to aid in retaining the latter in position against endwise movement, and means carried by the axle and into which the inner end of the hub extends for closing such inner end, said means and hub being complementally formed to permit removal of the hub as a unit without affecting the position of said means.

In testimony whereof I affix my signature in presence of two witnesses.

FRANKLIN C. HOCKENSMITH.

Witnesses:
J. M. NESBIT,
F. E. GAITHER.